US009223986B2

(12) United States Patent
Ashok et al.

(10) Patent No.: US 9,223,986 B2
(45) Date of Patent: Dec. 29, 2015

(54) METHOD AND SYSTEM FOR INFORMATION CONTENT VALIDATION IN ELECTRONIC DEVICES (71) Applicant: SAMSUNG ELECTRONICS CO., LTD., Suwon, Gyeonggi-do (KR)

(72) Inventors: Asokan Ashok, San Diego, CA (US); Atish Dipankar, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 13/654,300

(22) Filed: Oct. 17, 2012

(65) Prior Publication Data
US 2013/0283388 A1 Oct. 24, 2013

Related U.S. Application Data (60) Provisional application No. 61/637,785, filed on Apr. 24, 2012.

(51) Int. Cl.
*G06F 7/04* (2006.01)
*G06F 21/60* (2013.01)
*G06F 21/55* (2013.01)

(52) U.S. Cl.
CPC .............. *G06F 21/60* (2013.01); *G06F 21/554* (2013.01); *G06F 2221/2149* (2013.01)

(58) Field of Classification Search
CPC ... H04L 12/585; H04L 51/12; H04L 63/0227; G06F 21/60; G06F 21/554
USPC .......................................................... 726/26
See application file for complete search history.

(56) References Cited

U.S. PATENT DOCUMENTS

| 7,110,666 | B2 * | 9/2006 | Abe et al. .......................... 396/59 |
| 7,162,642 | B2 * | 1/2007 | Schumann et al. ........... 713/189 |
| 7,933,611 | B2 | 4/2011 | Bocking et al. |
| 8,121,845 | B2 * | 2/2012 | Kirby ............................ 704/273 |
| 8,218,015 | B2 * | 7/2012 | Wun .................. H04N 1/00103 348/207.99 |
| 8,359,642 | B1 * | 1/2013 | Wurtenberger ..... H04L 63/0227 709/206 |
| 8,490,176 | B2 | 7/2013 | Book et al. |
| 8,607,325 | B2 * | 12/2013 | Kennedy .......................... 726/12 |
| 2001/0051997 | A1 * | 12/2001 | Oku .............................. 709/217 |
| 2003/0126267 | A1 * | 7/2003 | Gutta et al. .................... 709/229 |
| 2004/0210532 | A1 * | 10/2004 | Nagawa et al. ................. 705/51 |
| 2005/0134696 | A1 * | 6/2005 | Nath ....................... H04N 7/185 348/211.9 |
| 2005/0286883 | A1 * | 12/2005 | Abe ................... H04N 1/00925 396/266 |

(Continued)

OTHER PUBLICATIONS

Imagevision, "Image Vision Labs Visual Filter", Oct. 12, 2011, 3 pages, Image Vision, USA.

(Continued)

*Primary Examiner* — Techane Gergiso
(74) *Attorney, Agent, or Firm* — Sherman IP LLP; Kenneth L. Sherman; Steven Laut (57) ABSTRACT

Content validation on an electronic device comprises detecting information content on an electronic device and validating the information content in real time in the electronic device. Validating the information content includes analyzing the information content to detect selected content and preventing dissemination of the selected content via the electronic device. The information content comprises content originating and/or terminating on the electronic device. The electronic device may comprise a mobile electronic device.

40 Claims, 9 Drawing Sheets

(56) References Cited

U.S. PATENT DOCUMENTS

| | | | |
|---|---|---|---|
| 2006/0051070 A1* | 3/2006 | Itsukaichi | H04N 5/772 386/229 |
| 2008/0012935 A1* | 1/2008 | Echtenkamp | H04N 5/772 348/14.02 |
| 2008/0134282 A1* | 6/2008 | Fridman et al. | 726/1 |
| 2009/0274364 A1* | 11/2009 | Shakya et al. | 382/165 |
| 2010/0095383 A1* | 4/2010 | Elazar et al. | 726/26 |
| 2010/0218260 A1* | 8/2010 | Schwartz et al. | 726/26 |
| 2010/0317336 A1* | 12/2010 | Ferren et al. | 455/419 |
| 2011/0047388 A1 | 2/2011 | Park et al. | |
| 2011/0065419 A1* | 3/2011 | Book et al. | 455/411 |
| 2011/0209195 A1* | 8/2011 | Kennedy | 726/1 |
| 2011/0267497 A1* | 11/2011 | Hickie | 348/231.7 |
| 2011/0288880 A1* | 11/2011 | Waugh | 705/2 |
| 2012/0026379 A1* | 2/2012 | Mori | G03B 17/20 348/333.02 |
| 2012/0051732 A1* | 3/2012 | Aoki | G03B 35/10 396/374 |
| 2012/0084838 A1* | 4/2012 | Inforzato et al. | 726/4 |
| 2012/0179787 A1* | 7/2012 | Walsh et al. | 709/219 |
| 2012/0324565 A1* | 12/2012 | Cohen | G06N 3/02 726/12 |
| 2013/0238472 A1* | 9/2013 | Fan et al. | 705/34 |
| 2013/0283401 A1 | 10/2013 | Pabla et al. | |

OTHER PUBLICATIONS

U.S. Non-Final Office Action for U.S. Appl. No. 13/865,945 mailed Sep. 2, 2014.

U.S. Final Office Action for U.S. Appl. No. 13/865,945 mailed Dec. 19, 2014.

Daintith, J., "Image Capture", A Dictionary of Computing, 2004, pp. 1-2, Encyclopedia.com, United States (downloaded from http://www.encyclopedia.com/doc/1O11-imagecapture.html on Apr. 15, 2015).

Rouse, M., "Capture", Search Security, Apr. 15, 2015, pp. 1-4, TechTarget.com, United Sates (downloaded from http://searchsecurity.techtarget.com/definition/capture on Apr. 15, 2015).

McClain, S. et al., "How Does a Camera Capture an Image?", Apr. 15, 2015, pp. 1-2, Science-Opposing Views, United States (downloaded from http://science.opposingviews.com/camera-capture-image-1129.html on Apr. 15, 2015).

U.S. Advisory Action for U.S. Appl. No. 13/865,945 mailed Mar. 23, 2015.

* cited by examiner

METHOD AND SYSTEM FOR INFORMATION CONTENT VALIDATION IN ELECTRONIC DEVICES

CROSS-REFERENCE TO RELATED APPLICATION

This application claims the priority benefit of U.S. Provisional Patent Application Ser. No. 61/637,785, filed on Apr. 24, 2012, incorporated herein by reference.

FIELD OF THE INVENTION

The present invention generally relates to content validation and in particular, to content filtering in mobile communication devices.

DESCRIPTION OF RELATED ART

With the rapid proliferation of mobile communication devices such as smartphones amongst users such as teenagers and children, there is an increase in abusive and/or inappropriate behavior through content communicated via such devices. These devices provide access to a number of multimedia and messaging applications along with internet connectivity, thus making a user of such devices vulnerable to "cyber bullying", "sexting", nudity, etc.

BRIEF SUMMARY OF THE INVENTION

The present invention generally relates to content validation. In one embodiment, content validation on an electronic device comprises detecting information content on an electronic device and validating the information content in real time in the electronic device. Validating the information content includes analyzing the information content to detect selected content and preventing dissemination of the selected content via the electronic device. The information content comprises content originating and/or terminating on the electronic device. The electronic device may comprise a mobile electronic device.

In one embodiment, the invention provides an end-to-end proactive process for detecting selected content and preventing consumption and dissemination of such content.

These and other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION OF THE INVENTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention generally relates to content validation and in particular, to content filtering in electronic devices such as mobile communication devices. In one embodiment, content validation comprises detecting information content on an electronic device and validating the information content in real time in the electronic device. In one embodiment, said information content comprises information content originating and/or terminating at the electronic device. In one embodiment, validating the information content includes analyzing the information content to detect selected content and preventing dissemination of the selected content via the electronic device. In one embodiment, preventing dissemination includes filtering out the selected content on the electronic device. In one embodiment, dissemination of content via the electronic device includes communication, transmission, reception, origination, and termination of content via the electronic device, as described in more detail hereinbelow.

In one embodiment, the invention provides a real-time system to validate selected content by screening and filtering out selected content before such content reaches the user device. In one embodiment, the invention provides a real-time system to validate by screening and filtering out selected content before the content is sent out by the user device. In one embodiment, the invention provides a real-time system for such content validation and control (such as parental control) to prevent communication of selected content such (as abusive and/or inappropriate content) to and from user devices.

In one embodiment, the system is not internet-based and does not require server validation (such as SMSC/MMSC or sending out the content to a server located in the network). The system is suitable for a mobile device environment wherein at least a portion of content validation is performed on the device itself in real time.

In one embodiment the invention provides an end-to-end proactive process for detecting selected content and preventing consumption and dissemination of such content.

In one implementation, the invention provides a real-time, end-to-end, device-integrated protocol and system for mobile communication devices such as wireless mobile communication devices (e.g., smartphones and tablets) to proactively prevent users such as teenagers from indulging in inappropriate behavior including, but not limited to: (1) sending/receiving (to individuals or broadcasting) text messages and e-mails with selected content such as sexually explicit words, swear words, short forms with sexual meanings, etc., (2) sending/receiving (to individuals or broadcasting) selected content such as nude images/videos, images/videos showing private body parts through e-mail, MMS and social networking sites, etc., (3) viewing selected content such as pornography, explicit user-generated videos on browsers, media players or custom applications, etc., and (4) capturing selected content such as sexually explicit images/videos through a mobile device camera.

In one embodiment the invention provides a real-time, end-to-end, device-integrated protocol implementing a holistic approach of placing checkpoints at processing and functional points in a mobile device through which the user can create, capture, share, receive and consume content such as texts, e-mails, images, videos, etc. Said protocol is integrated with hardware and software components of the mobile device for content validation including filtering out content originating from the mobile device as well as terminating on the mobile device, according to an embodiment of the invention.

In one example implementation of the invention, placing content validation at an origination point in a mobile device includes placing content validation at a camera module in the mobile device to prevent capturing of selected content such as inappropriate image/video, wherein content validation includes real-time analysis of live video frames from the mobile device camera. In another example implementation, placing content validation at an origination point in a mobile device includes placing content validation at email/SMS applications, wherein content validation includes monitoring and preventing creation of selected content by real-time word matching against a list such as a black list of words and/or phrases.

In one example implementation of the invention, placing content validation at a termination point in a mobile device includes placing content validation at image gallery storage (e.g., in the mobile device), wherein content validation includes analyzing each image/video file before opening it (e.g., from an email attachment) and preventing viewing if found to be inappropriate. In another example implementation of the invention, placing content validation at a termination point in a mobile device includes placing content validation at a browser on the mobile device, wherein content validation includes analyzing and preventing access to selected content from each link.

In another example implementation of the invention, placing content validation at a termination point in a mobile device includes placing content validation at SMS/Email application in the mobile device, wherein content validation includes analyzing messages for selected content such as black listed words and filtering out such selected content before showing messages to the user.

In one example, content validation includes filtering only selected words (e.g., "bad" words). Or, such content validation filtering may include preventing the user from viewing the entire sentence itself. The filtering may be based on application and business partner requests (e.g., the carriers). The key is analyzing words before they can be viewed by the user on a display (or heard via an audio device) and taking one of multiple possible steps to handle the outcome once the trigger (i.e., selected words) is received.

In another example implementation of the invention, placing content validation at MMS application, wherein content validation includes analyzing each image/video received, and filtering out selected content before showing it to user.

In one embodiment, content validation includes filtering out selected content from media before the media originates or terminates on a mobile device. In another embodiment, content validation includes preventing access to media that includes such selected content via the mobile device. In one embodiment, content validation, according to an embodiment of the invention, includes analyzing media and filtering out selected content during creation, using real-time analysis of media (such as images, videos, text, words, web site links, etc.) on the mobile device. The analysis is performed in real time on the mobile device itself, and therefore it is network and server-independent.

Figure 1:
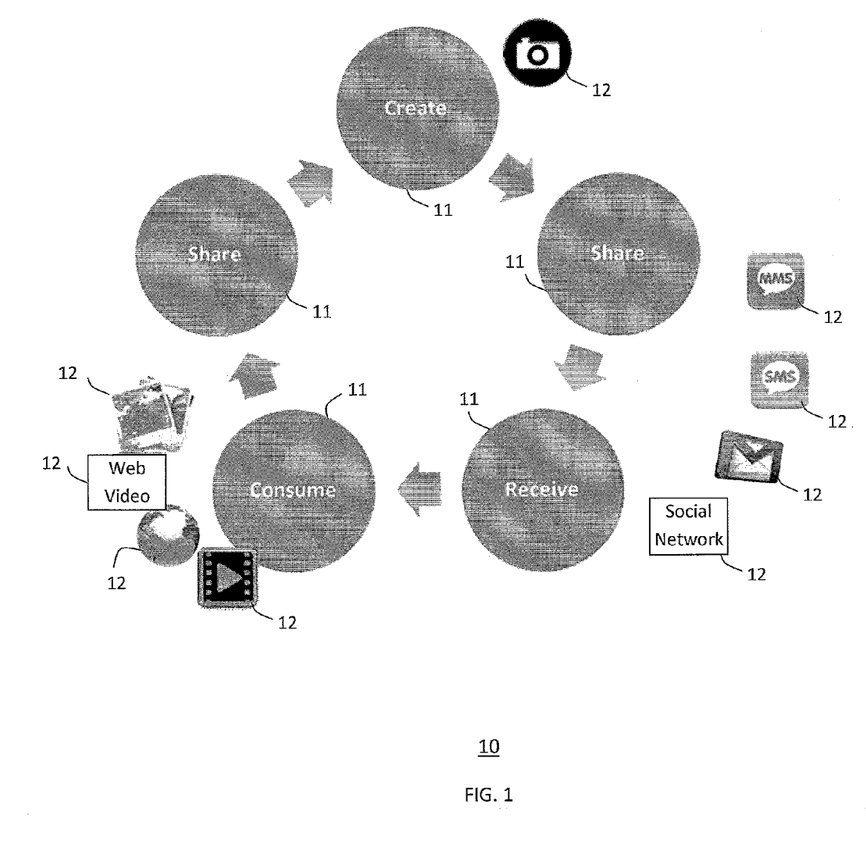
FIG. 1 shows a block diagram of content validation architecture on a mobile device, according to an embodiment of the invention.

FIG. 1 shows a block diagram of architecture 10 for content validation checkpoints 11 on a mobile device for stages in the life of content, such as when content originates, terminates and is processed in a mobile device. In one embodiment, the content validation checkpoints include content validation modules 12 that analyze, find, and filter selected content such as inappropriate content (e.g., images, videos, texts, emails) that originates and terminates at the mobile device. The content validation modules proactively prevent selected content from being recorded, sent/received, and consumed via the mobile device.

In one embodiment, the content validation modules include image, video, URL, and text analysis engines at checkpoints situated both on the mobile device as well as in the network. For applications which inherently rely on network connectivity, such as online video streaming, the content validation/analysis modules may be implemented over the network on a server. The choice between content validation at the device or at the server depends on several factors including device performance tradeoffs (e.g., latency, processing, power consumption, etc.) The invention proactively screens out content before it reaches the user's eyes rather than reactively raising alerts. Example scenarios for placing content validation on a network server include viewing videos on a website and viewing nude/inappropriate images on a website. The content validation modules 12 are integrated seamlessly with mobile device functions for content origination, termination, and processing, as described herein.

Figure 2:
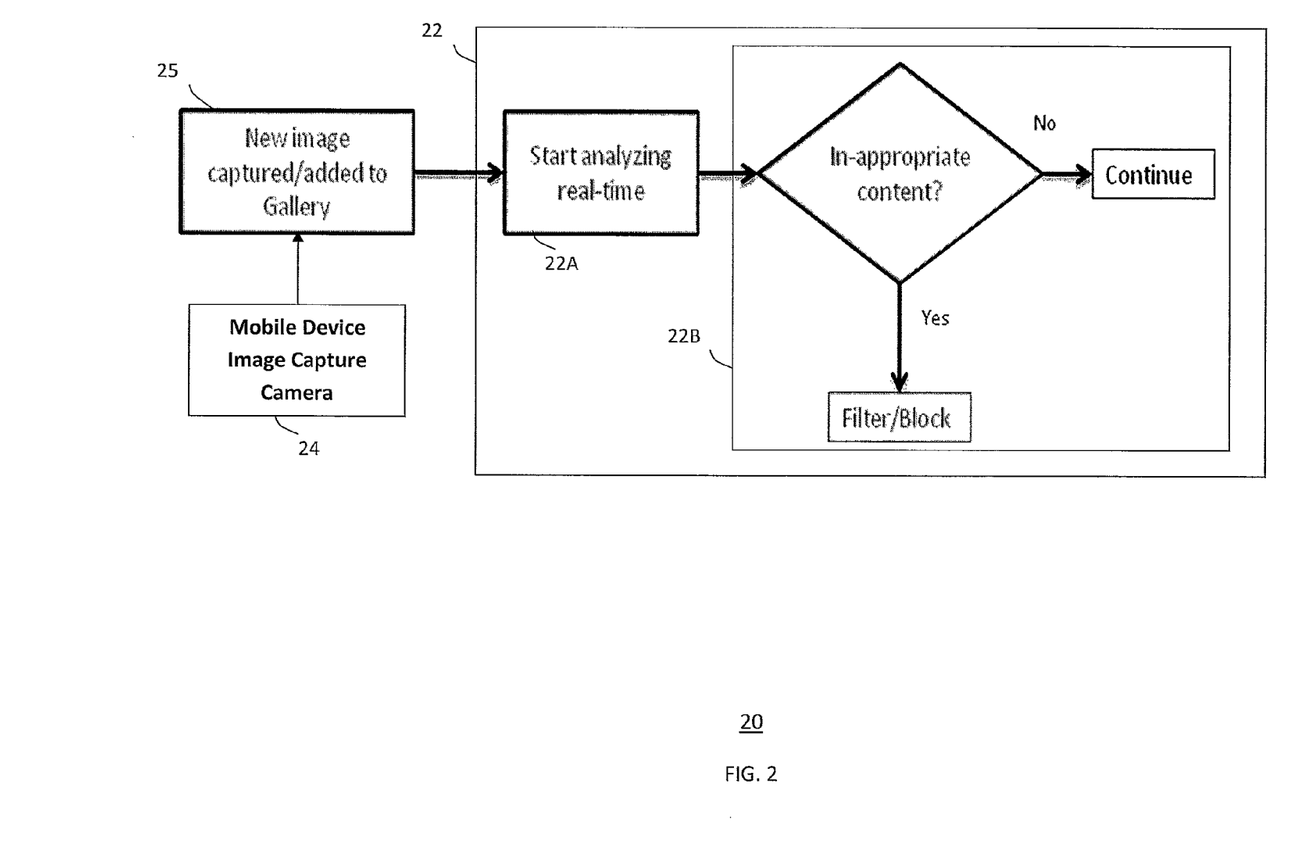
FIG. 2 shows a block diagram of an architecture for image content validation for an image capture camera on a mobile device, according to an embodiment of the invention.

FIG. 2 shows a block diagram of an architecture 20 for an implementation of a content validation module 12 as an image content validation module 22 for an image capture camera 24 on a mobile device, according to an embodiment of the invention. In one embodiment, the image content validation module 22 provides real-time image detection to prevent capturing selected content, such as nude images/videos, via the camera 24. The image content validation module 22 includes an image analysis engine 22A, which analyzes an image 25 to detect selected content therein, and a controller 22B that filters the detected selected content (e.g., inappropriate nudity image). An example of the image analysis engine 22A comprises an Image and Video Filtering module from IMAGEVISION located at Anna, Tex., 75409, U.S.A.

In one embodiment, the content validation module 22 is not network-dependent, and performs its function on the mobile device. In another embodiment, the content validation module 22 performs post and processing/integration with the gallery. In one example implementation, analysis of image/video content for content validation begins after the content is captured but before it is saved in the gallery/file structure. Saving only occurs once the content validation module clears the content (e.g., indicates the content does not include inappropriate information). Otherwise, the content is not saved and any (if at all) temporary files or caches are deleted.

In another example implementation, analysis of image/video content for content validation includes analysis of raw content frames as soon as a device camera is invoked either for video or still image capture. Real-time frame analysis is performed on the raw frames received from the camera buffer at a particular sampling rate appropriate to meet performance requirements while allowing desired content filtering. In one example, whenever frames including inappropriate content are detected, corresponding functions are invoked such as disabling camera shutter, turning off camera, etc. The analysis and invoked functions can be based on several factors including performance (e.g., processing power, battery, latency, etc.), partner requests (e.g., carrier requests), business case variations, cultural nuances, target demographics (e.g., age, geographical region, etc.).

Figure 3:
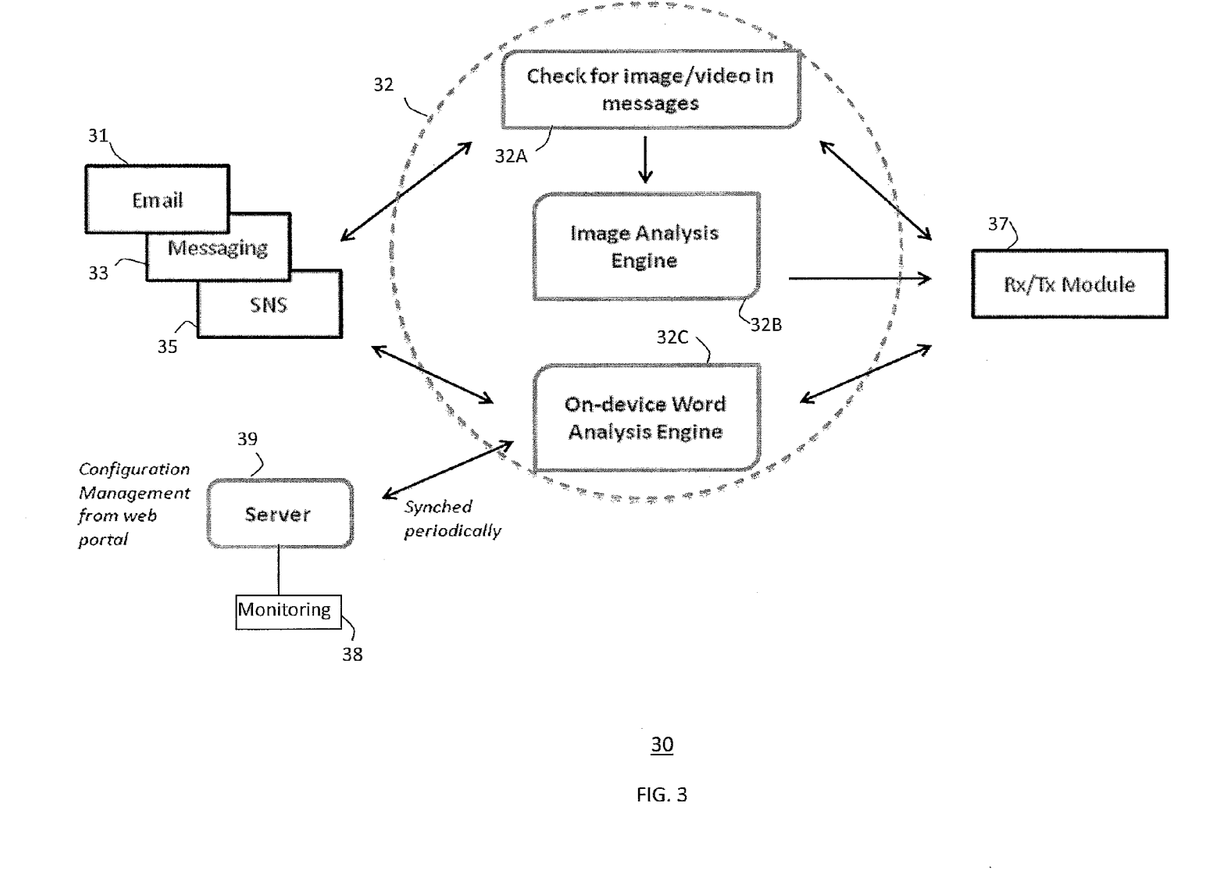
FIG. 3 shows a block diagram of an architecture for image content and word content validation on a mobile device, according to an embodiment of the invention.

FIG. 3 shows a block diagram of an architecture 30 for an implementation of a content validation module 12 as a content validation module 32 on a mobile device, according to an embodiment of the invention. In one embodiment, the content validation module 32 intercepts message flow to check outgoing and incoming content for selected content. In one implementation, the content validation module 32 interfaces with an e-mail module 31, a messaging module 33, a SNS module 35, and a transceiver module 37. The content validation module 32 intercepts message flow through modules 31, 33, 35, and 37 and checks outgoing and incoming content for selected content.

In one embodiment, the content validation module 32 includes a detector 32A that checks for an image/video in a message. The content validation module 32 further includes an image analysis module 32B that checks a detected image/video for selected image content (e.g., nudity) and filters out the image/video if it contains said selected image content. The content validation module 32 further includes a word analysis module 32C that checks a message for selected word content (e.g., selected words, phrases) and filters out the message if it contains said selected word content.

In one embodiment, the content validation module 32 prevents consumption of selected content by integrating with mobile device applications (e.g., Web Browser, Gallery Application, YouTube, Media Player) to disallow viewing/playing inappropriate content. Such integration, at lower application layers on the mobile device, allows validation of content such as streaming content (e.g., video/photos) before such content is shown on a display screen of the mobile device.

In one embodiment, the present invention provides a web portal monitoring module 38 for a secure web-based frontend, which users (e.g., parents) can access to monitor traffic on selected user (e.g., teenager) mobile devices. In one example, the monitoring module 38 allows viewing images and videos taken and received on a selected user mobile device. The monitoring module 38 further allows separate viewing for deleted/black listed content originated/terminated on a selected user mobile device. The monitoring module 38 further allows viewing filtered out texts, emails, containing black listed words originated/terminated on a selected user mobile device. The monitoring module 38 further allows set up of alerts for certain events (e.g., incoming nude picture, etc.) on a selected user mobile device. The server 39 hosts black listed words, acronyms, and phrases dictionaries which will be periodically synchronized to the one residing on the device. The period can be customizable (e.g., once per week). This will ensure that the on-device black list is always up-to-date.

Figure 4:
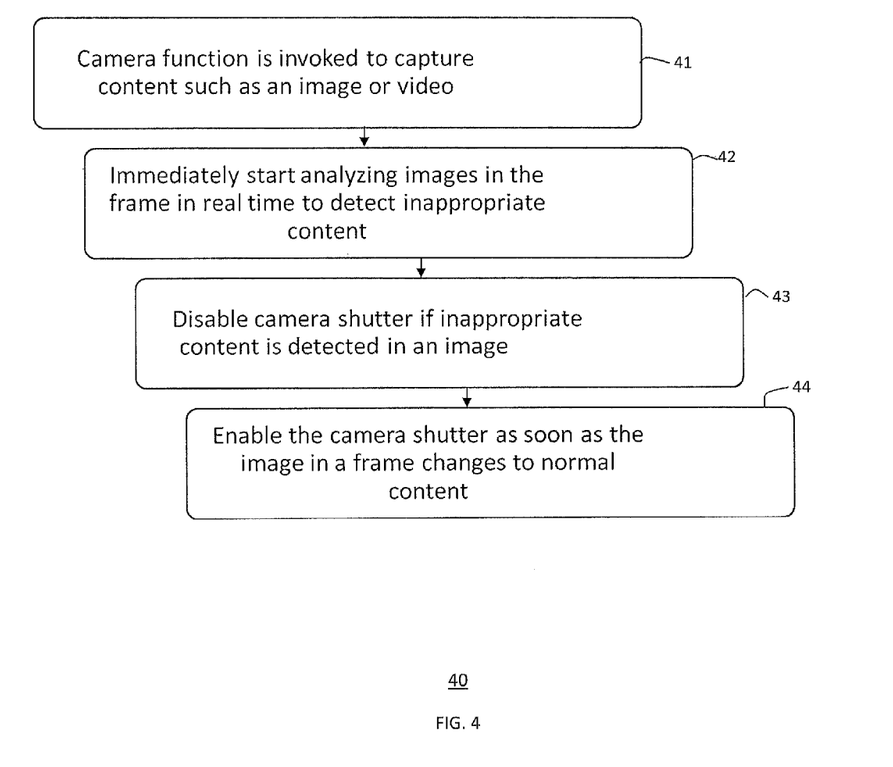
FIG. 4 shows a flowchart of a content validation process with camera application integration for filtering selected content, according to an embodiment of the invention.

FIG. 4 shows a flowchart of a content validation process 40 for filtering selected content originating at a mobile device (such as wireless mobile phone or tablet device), according to an embodiment of the invention. The mobile device has an image capture camera. The content validation process 40 is integrated with the mobile device functions (i.e., camera integration) for analyzing content and filtering out inappropriate content originating at the mobile device.

In process block 41, the device camera function is invoked for a user to capture content such as an image or video. In process block 42, each image frame (or video frame) is immediately analyzed in real time to detect selected content (e.g., nudity, over exposed body) in the image frame. Process block 43 comprises disabling the camera shutter if such selected content is detected in the image frame. In one example, such image frame is discarded so that is it not available for further processing such as storage, viewing, transmission, etc. Process block 44 comprises repeating process blocks 42-43 for each image frame and enabling the camera shutter to capture a next image frame as soon as an analyzed image frame does not contain the selected content.

Figure 5:
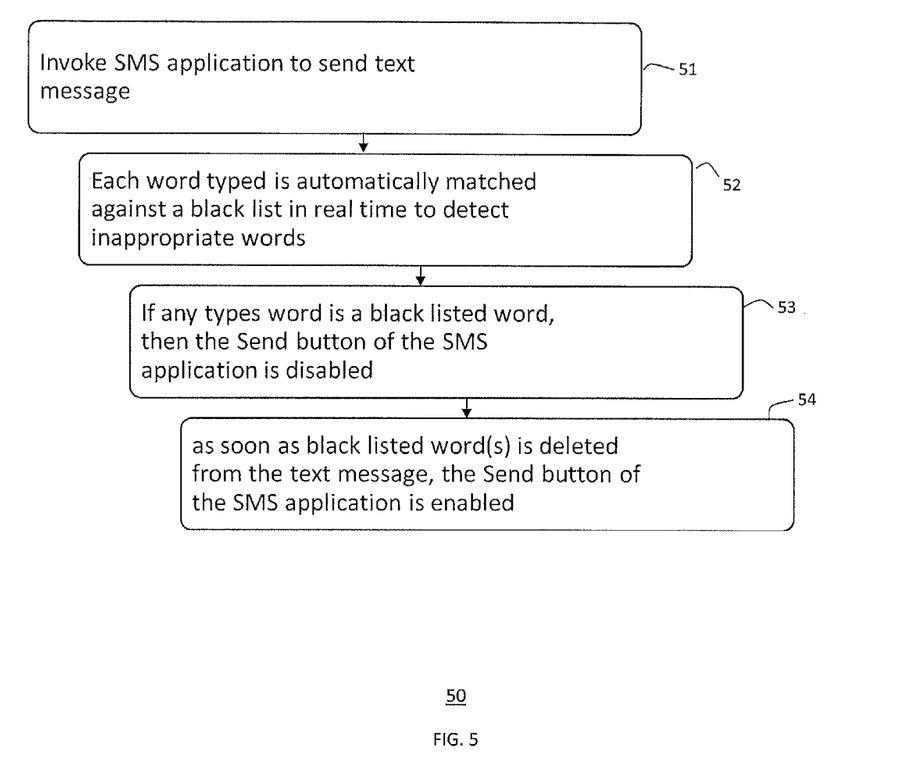
FIG. 5 shows a flowchart of another content validation process with SMS application integration for filtering selected content, according to an embodiment of the invention.

FIG. 5 shows a flowchart of a content validation process 50 for filtering selected content originating at a mobile device (such as wireless mobile phone or tablet device), according to an embodiment of the invention. The mobile device can wirelessly communicate information. The content validation process 50 is integrated with the mobile device functions (i.e., SMS Integration) for analyzing content and filtering out inappropriate content originating at the mobile device.

Process block 51 comprises invoking SMS application of the mobile device for user to send text message. In process block 52, each word typed is automatically analyzed by matching against selected content in real time (e.g., a black list of inappropriate words) to detect if the word is inappropriate. In process block 53, if any typed word is a black listed word, then the Send button of the SMS application is disabled. The user is allowed to edit the words typed in, and the words are analyzed as in process blocks 52-53. In process block 54, as soon as all black listed words are deleted from the text message, the Send button of the SMS application is enabled again.

In one example, a user keeps typing a message normally without any interruptions even for black listed words. When the user attempts to send the message, a content validation module intercepts the send command and performs analysis on the message text to detect black listed words before the message is actually sent. If none is detected, then the message is transmitted from the device. If a black listed word is detected, then the user is notified told that the message cannot be sent because of the content or the control is returned to the SMS application to transmit the message with the black listed words deleted. In another example, for every word that is typed, it is immediately matched against a black list and the send button is disabled if a current sentence includes any black-listed words. Only when the complete sentence is devoid of any black listed words is the send button enabled for the user to send the message.

Figure 6:
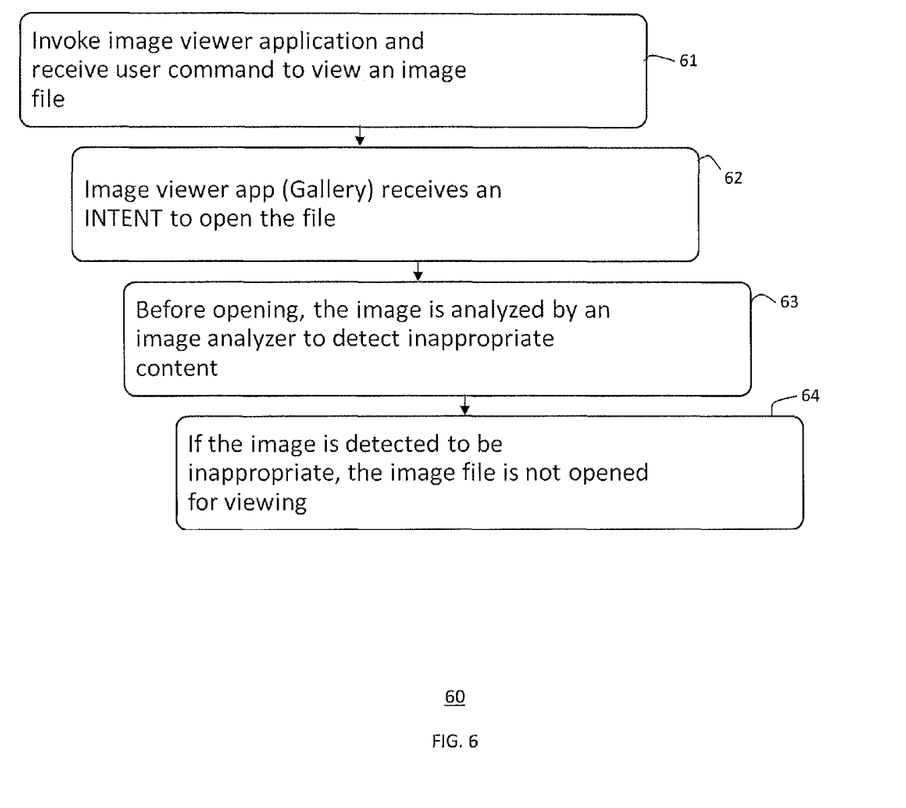
FIG. 6 shows a flowchart of another content validation process with image viewer application integration for filtering selected content, according to an embodiment of the invention.

FIG. 6 shows a flowchart of a content validation process 60 for filtering out selected content terminating at a mobile device (such as wireless mobile phone or tablet device), according to an embodiment of the invention. The mobile device can wirelessly communicate information. The content validation process 60 is integrated with the mobile device functions (i.e., image gallery integration) for analyzing content and filtering out incoming inappropriate content terminating at the mobile device.

Process block 61 comprises invoking image viewer application (e.g., image gallery) of the mobile device for a user to view an incoming image on the mobile device display and receiving user command (e.g., user click) to view an image file (e.g., from email/SMS). In process block 62, the image viewer application receives an intent to open image file message. In process block 63, before opening, the image is analyzed by an image analyzer to detect selected content such as inappropriate nudity. In process block 64, if the image is detected to be inappropriate, the image file is not opened for viewing. The user receives a message (e.g., "Content inappropriate to view" message).

Figure 7:
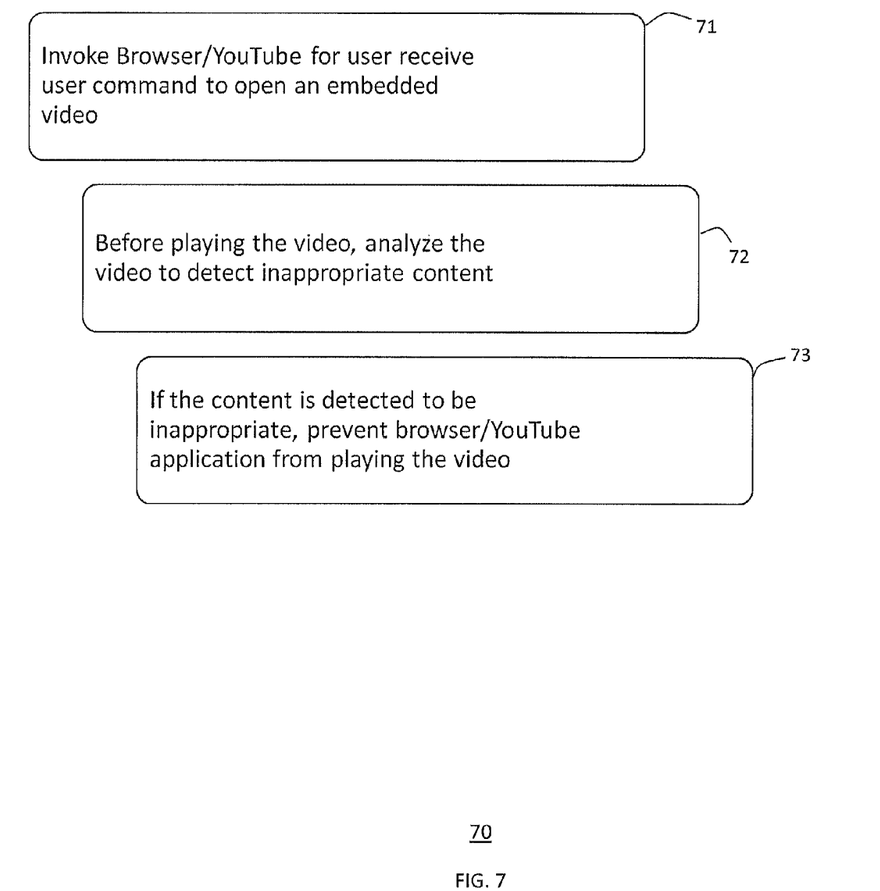
FIG. 7 shows a flowchart of another content validation process with browser application integration for filtering selected content, according to an embodiment of the invention.

FIG. 7 shows a flowchart of a content validation process 70 for filtering selected content terminating at a mobile device (such as wireless mobile phone or tablet device), according to an embodiment of the invention. The mobile device can wirelessly communicate information. The content validation process 70 is integrated with the mobile device functions (i.e., Browser/YouTube Integration) for analyzing content and filtering out incoming inappropriate content terminating at the mobile device.

Process block 71 comprises invoking a web application, such as a browser or YouTube based on user request, and receiving user command to open an embedded video from the Internet. Process block 72 comprises, before playing the video, analyzing the video to detect selected content such as inappropriate content. Process block 73 comprises, upon detecting in appropriate content, preventing the web application from playing the video. In one example, the video is completely stopped from playing on the mobile device. In another example, image frames within appropriate content are deleted from the video and the remainder of the images frames are displayed to the user on the mobile device.

Figure 8:
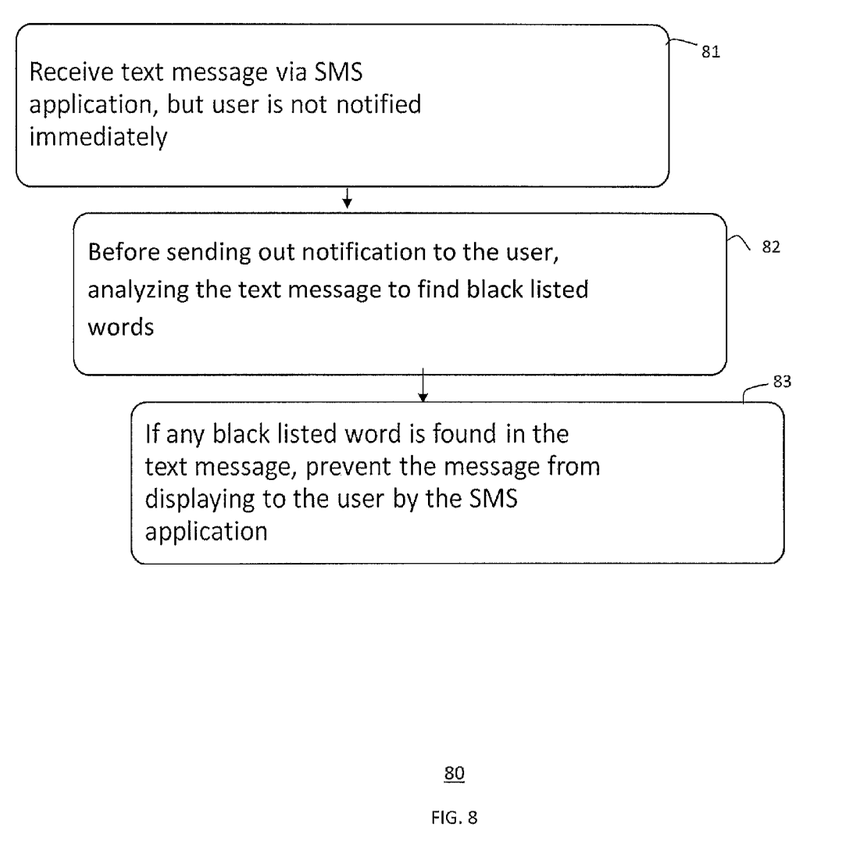
FIG. 8 shows a flowchart of another content validation process with SMS application integration for filtering selected content, according to an embodiment of the invention.

FIG. 8 shows a flowchart of a content validation process 80 for filtering selected content terminating at a mobile device (such as wireless mobile phone or tablet device). The mobile device can wirelessly communicate information. The content validation process 80 is integrated with the mobile device functions (i.e., SMS Integration) for analyzing content and filtering out incoming inappropriate content terminating at the mobile device.

Process block 81 comprises receiving an SMS text message via an SMS application on the mobile device, without notifying the user of the received text message. Process block 82 comprises, before sending out notification to the user on the mobile device, analyzing the text message to find black listed words (e.g., inappropriate words, profanity). Process block 83 comprises, if any black listed words are found, preventing the message from being displayed to the user on the mobile device by the SMS application. In one example, a received SMS message with inappropriate words is deleted (filtered out) without user knowledge. In another example, a received SMS message with inappropriate words is not displayed, but the user is notified that a SMS text message has arrived, which was not shown due to inappropriate content.

In one or more of the above content validation processes, if content validation indicates that inappropriate content is not detected, then the content is processed by the mobile device as normal operation (i.e., without filtering out by the content validation process).

In one embodiment of the invention, filtering out selected content (e.g., inappropriate content) from terminated/originated content comprises blocking the entire terminated/originated content that includes the selected content. In another embodiment, filtering out selected content comprises blocking only the detected selected content and processing the remainder of the terminated/originated content as usual. There may also be relevant messages or pop-ups to let the user know that content was blocked. There may also be a notification or alert sent out to other users (e.g., parent) when such inappropriate content is detected.

According to embodiments of the invention, after content is analyzed (and found to include selected content such as inappropriate content), such content may be handled in different ways, including but not limited to: deleted without user knowledge, deleted with user knowledge (e.g., pop-up notification), sending notification (e.g., SMS, email) to a controlling individual such as a parent, and generating a warning pop-up (e.g., "this content is inappropriate for your viewing") but without deleting the content or notifying the parent.

According to embodiments of the invention, web portal monitoring by a controlling individual such as a parent includes automatically uploading detected inappropriate content from the mobile device to a server that is accessible by such individual. The individual is allowed to view the inappropriate content and take actions including: set thresholds for flagging selected content (e.g., according to age, personal preferences, etc.) to prevent dissemination thereof, set up alerts for certain events, and enable/disable features on the mobile device.

Figure 9:
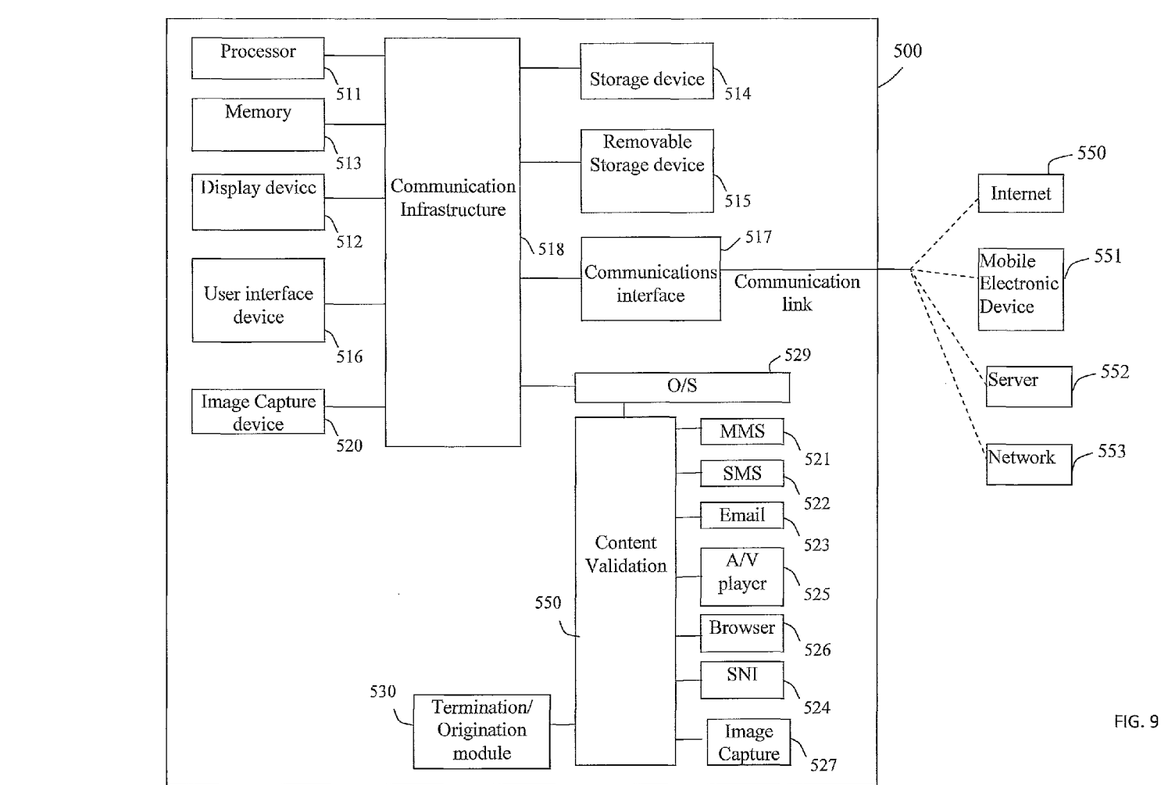
FIG. 9 is a high-level block diagram showing an information processing system comprising a computing system implementing an embodiment of the present invention.

FIG. 9 is a high-level block diagram showing an information processing system comprising a computing system 500 implementing an embodiment of the present invention. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices. The system 500 further includes a communications infrastructure 518 (e.g., a communications bus, crossover bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of the invention in a mobile wireless device such as a mobile phone, the system 500 further includes an image capture device such as a camera 520. The system 500 further includes application modules at which content terminates/originates such as MMS module 521, SMS module 522, e-mail module 523, social network interface (SNI) module 524, audio/video (AV) player 525, web browser 526, image capture module 527, etc.

The system 500 may include one more other application modules 530 at which content terminates and/or originates.

The system 500 further includes a content validation module 550 as described herein, according to an embodiment of the invention. The content validation module 550 performs content validation on the system 500 in real time, such as described herein in relation to FIGS. 4-8. Example implementations of the content validation module 550 are the module 22 in FIG. 2 and the module 32 in FIG. 4.

In one implementation of said application modules, content validation modules along with an operating system 529 may be implemented as executable code residing in a memory of the system 500. In another embodiment, such modules are in firmware, etc. Preferably, the content validation modules cannot be uninstalled from the device and the user will not have any way to disable the content validation features. Hence, the content validation is embedded into the operating system or firmware of the device at various levels (e.g., libraries, framework levels. etc.) The content validation modules are integrated with said application modules to provide content validation according to embodiments of the invention.

In one example, the content validation integration is implemented as code (e.g., utilizing API of the application modules) for intercepting command, control, and information flow in the application modules and providing access to content terminated/originated at such application modules for performing content validation.

In one embodiment, the system 500 may communicate with one or more of Internet 550, mobile electronic device 551, server 552, network 553 in a wire and/or wireless manner.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of the invention.

Though the present invention has been described with reference to certain versions thereof; however, other versions are possible. Therefore, the spirit and scope of the appended claims should not be limited to the description of the preferred versions contained herein.

What is claimed is:

1. A method for content validation, comprising:
   detecting information content on a mobile electronic device, wherein the information content originates on the electronic device;
   validating the information content wherein validating the information content includes:
   analyzing, by the mobile electronic device, the information content in a live image or video frame on the mobile electronic device to detect selected content for preventing capture of the selected content comprising image or video content,
   wherein preventing capture comprises at least one of disabling a shutter of an image capture device and turning off the image capture device in response to detection of the selected content in the live image or video frame.

2. The method of claim 1, wherein:
   detecting information content on the mobile electronic device comprises detecting origination of information content on the mobile electronic device by the mobile electronic device.

3. The method of claim 2, wherein:
   detecting origination of information content on the mobile electronic device comprises detecting the information content in real-time as the information-content is being created via a content creation interface on the mobile electronic device.

4. The method of claim 3, wherein the content creation interface is selected from: the image capture device, an SMS interface, an MMS interface, an e-mail interface, a browser, and a social network application.

5. The method of claim 1, further comprising:
filtering of the selected content to prevent communication of the selected content from the mobile electronic device.

6. The method of claim 1, wherein:
detecting information content on the mobile electronic device is performed proactively by the mobile electronic device before providing access to the information content.

7. The method of claim 6, wherein:
filtering the selected content prevents access to the selected content via the mobile electronic device.

8. The method of claim 1, wherein:
the information content comprises one or more of text, image, video and audio information content.

9. The method of claim 1, wherein the mobile electronic device comprises a wireless mobile communication device.

10. The method of claim 1, wherein the selected content is predetermined by a controlling device.

11. The method of claim 1, wherein preventing dissemination of the selected content via the mobile electronic device, comprises filtering out the selected content on the mobile electronic device and preventing consumption of the selected content on the mobile electronic device.

12. The method of claim 1, wherein preventing dissemination of the selected content via the mobile electronic device, comprises filtering out the selected content on the mobile electronic device and preventing communication of the selected content from the mobile electronic device.

13. The method of claim 1, wherein validation of the selected content occurs on the mobile electronic device before the selected content is shown on a display screen of the mobile electronic device, and the selected content comprises sexually explicit image or video content.

14. The method of claim 1, wherein disabling a shutter of the image capture device or turning off the image capture device to prevent capture of the selected content in the live image or video frame is based on at least one of a performance factor and target demographics.

15. A non-transitory computer-readable storage medium embodied thereon instructions being executable by at least one processor to perform a method for content validation, the method comprising:
detecting information content on a mobile electronic device, wherein the information content originates on the mobile electronic device;
validating the information content in real-time in the mobile electronic device, wherein validating the information content includes:
analyzing, by the mobile electronic device, the information content in a live image or video frame to detect selected content via the electronic device for preventing capture of the selected content comprising image or video content, wherein preventing capture comprises at least one of disabling a shutter of an image capture device and turning off the image capture device in response to detection of the selected content in the live image or video frame.

16. The non-transitory computer-readable storage medium of claim 15, further comprising:
filtering of the selected content to prevent communication of the selected content from the mobile electronic device.

17. The non-transitory computer-readable storage medium of claim 16, wherein:
detecting information content on the mobile electronic device comprises detecting origination of information content on the mobile electronic device by the mobile electronic device.

18. The non-transitory computer-readable storage medium of claim 17, wherein:
detecting origination of information content on the mobile electronic device comprises detecting the information content in real-time as the information content is being created via a content creation interface on the mobile electronic device.

19. The non-transitory computer-readable storage medium of claim 18, wherein the content creation interface comprises any one of:
the image capture device, an SMS interface, an MMS interface, an email interface, a browser, and a social network application.

20. The non-transitory computer-readable storage medium of claim 16, wherein:
filtering the selected content prevents dissemination of the selected content by the mobile electronic device.

21. The non-transitory computer-readable storage medium of claim 16, wherein:
detecting information content on the mobile electronic device occurs prior to user access of the information content.

22. The non-transitory computer-readable storage medium of claim 21, wherein:
filtering the selected content prevents access to the selected content via the mobile electronic device.

23. The non-transitory computer-readable storage medium of claim 16, wherein:
the information content comprises one or more of text, image, video and audio information content.

24. The non-transitory computer-readable storage medium of claim 16, wherein the mobile electronic device comprises a wireless mobile communication device.

25. The non-transitory computer-readable storage medium of claim 15, wherein the selected content is predetermined by a controlling device.

26. The non-transitory computer-readable storage medium of claim 15, wherein preventing dissemination of the selected content via the mobile electronic device comprises filtering out the selected content locally on the mobile electronic device and preventing consumption of the selected content on the mobile electronic device.

27. The non-transitory computer-readable storage medium of claim 15, wherein preventing dissemination of the selected content via the mobile electronic device comprises filtering out the selected content locally on the mobile electronic device and preventing communication of the selected content from the mobile electronic device.

28. A mobile electronic device, comprising:
a processor device; and
a detector configured to detect information content on the mobile electronic device using the processor device;
wherein the processor device is configured to validate the information content in real-time in the mobile electronic device by analyzing the information content in a live image or video frame to detect selected content to prevent capture of the selected content comprising image or video content, and the processor is further configured to prevent capture by at least one of disabling a shutter of an image capture device and turning off the image capture device in response to detection of the selected content in the live image or video frame, and the information content originates on the mobile electronic device.

29. The mobile electronic device of claim 28, further comprising:
filtering the selected content from the information content locally on the mobile electronic device to prevent communication of the selected content from the mobile electronic device.

30. The mobile electronic device of claim 29, wherein:
the detector detects information content on the mobile electronic device by detecting origination of information content in real-time on the mobile electronic device.

31. The mobile electronic device of claim 30, wherein:
the processor device filters the selected content to prevent dissemination of the selected content from the mobile electronic device.

32. The mobile electronic device of claim 29, wherein:
the detector detects origination of user created information content in real-time on the mobile electronic device by detecting created information content via a content creation interface on the mobile electronic device.

33. The mobile electronic device of claim 32, wherein the content creation interface comprises any one of: the image capture device, an SMS process, an MMS process, an email process, a browser, and a social network application.

34. The mobile electronic device of claim 29, wherein:
the information content comprises any one of text, image, video and audio information content.

35. The mobile electronic device of claim 29, wherein the mobile electronic device comprises a wireless mobile communication device.

36. The mobile electronic device of claim 29, wherein:
the detector detects information content on the mobile electronic prior to user access or notification of the information content.

37. The mobile electronic device of claim 36, wherein:
the validation interface filters the selected content to prevent access to the selected content via the mobile electronic device.

38. The mobile electronic device of claim 28, wherein the selected content is predetermined by a controlling device.

39. The mobile electronic device of claim 28, wherein the validation interface prevents dissemination of the selected content via the mobile electronic device by filtering out the selected content locally on the mobile electronic device and preventing consumption of the selected content on the mobile electronic device.

40. The mobile electronic device of claim 28, wherein the validation interface prevents dissemination of the selected content via the mobile electronic device by filtering out the selected content locally on the mobile electronic device and preventing communication of the selected content from the mobile electronic device.

* * * * *